L. S. GARDNER.
ART OF COLORING WOOD.
APPLICATION FILED DEC. 8, 1908.

952,245.

Patented Mar. 15, 1910.
2 SHEETS—SHEET 1.

L. S. GARDNER.
ART OF COLORING WOOD.
APPLICATION FILED DEC. 8, 1908.

952,245.

Patented Mar. 15, 1910.
2 SHEETS—SHEET 2.

UNITED STATES PATENT OFFICE.

LEVI S. GARDNER, OF OTTS MILLS, LOUISIANA, ASSIGNOR, BY MESNE ASSIGNMENTS, TO GARDNER WOOD COMPANY, OF CORBIN, LOUISIANA, A CORPORATION OF LOUISIANA.

ART OF COLORING WOOD.

952,245.  Specification of Letters Patent.  Patented Mar. 15, 1910.

Application filed December 8, 1908. Serial No. 466,561.

*To all whom it may concern:*

Be it known that I, LEVI SARGENT GARDNER, a citizen of the United States of America, and a resident of Otts Mills, in the parish of Livingston, in the State of Louisiana, have invented certain new and useful Improvements in the Art of Coloring Wood, of which the following is a specification.

This invention relates to coloring the interior fibers of wood.

The object of the invention is to secure in a simple and economical manner the distribution through the interior fibers of the wood of artificial coloring matter or matter which will change the color of the wood in the parts thereof subjected to its action.

The invention consists principally in severing the fibers of a living tree, applying a coloring matter thereto and permitting the circulation in the living tree to distribute such coloring matter thereinto.

By coloring matter I mean to include any matter which will circulate through the pores of the tree to effect a substantial change of color therein. This matter may consist of an actual coloring matter, such for instance, as a green coal tar color, or a chemical or chemicals which will ultimately produce a change of color in the wood.

The invention may be carried out in various ways, some of which will be hereinafter described.

Figure 1:
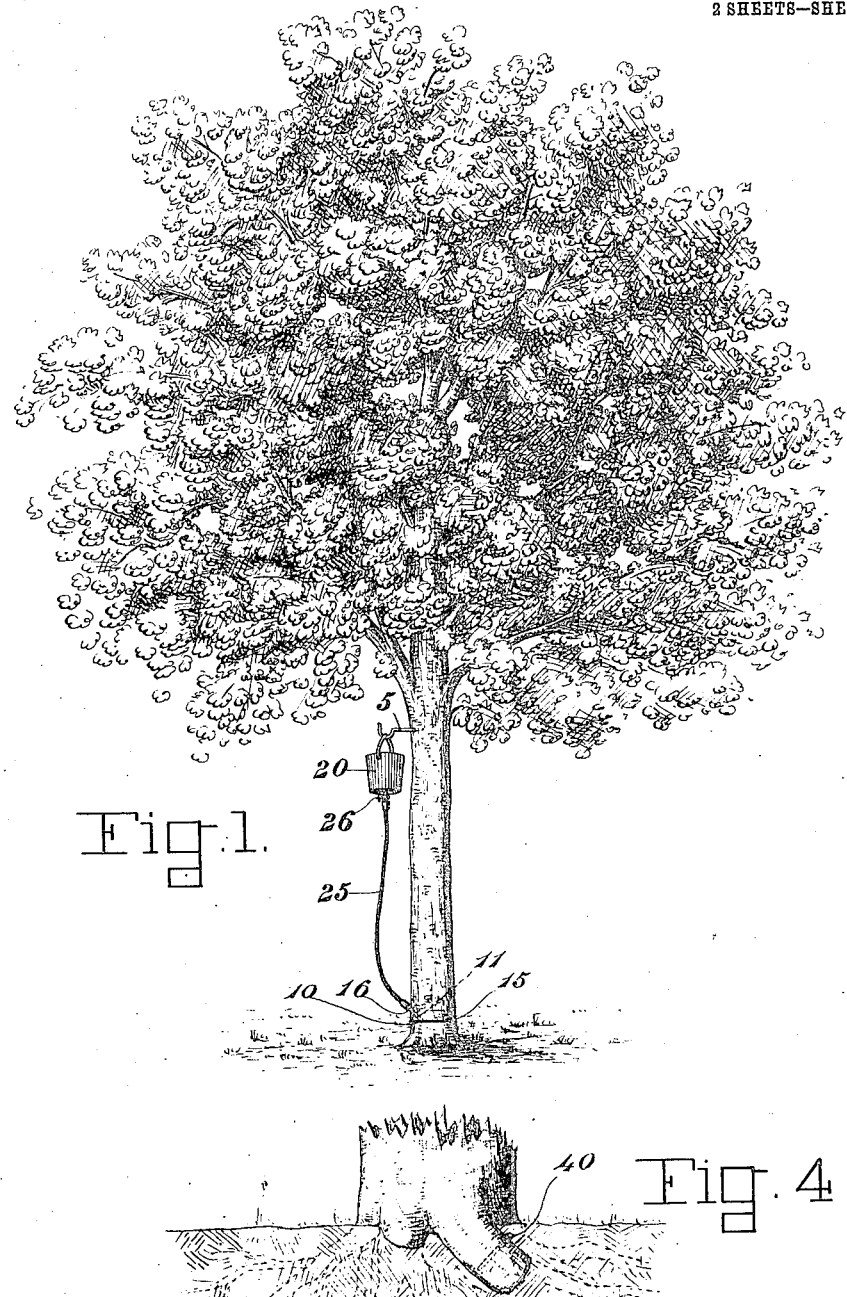
Figure 2:
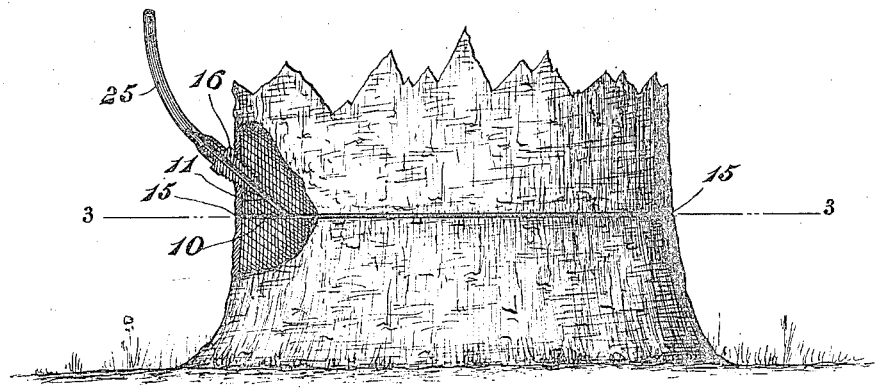
Figure 3:
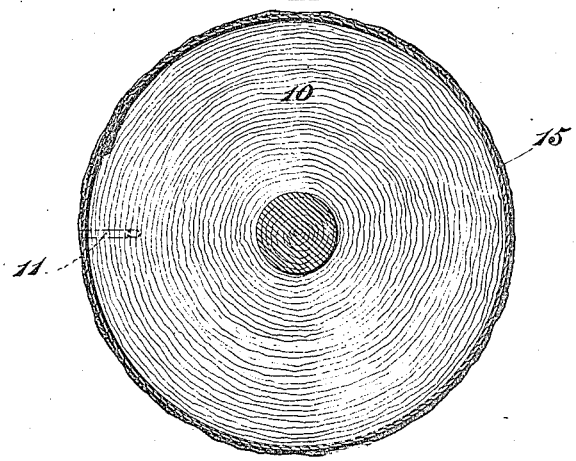

Figure 1 of the accompanying drawings represents a side elevation of a live tree, provided with means for effecting a change of color in parts thereof in accordance with one form of this invention. Fig. 2 represents an enlarged side elevation of the trunk of said tree. Fig. 3 represents on an enlarged scale a transverse section of said live tree on line 3—3 of Fig. 1. Fig. 4 represents a side elevation of a live tree, the top thereof being omitted for convenience of illustration, said figure showing another means of supplying coloring matter in accordance with my invention.

Similar numerals represent corresponding parts in the different figures.

In carrying out my invention in accordance with the plan illustrated in Figs. 1 and 2, a kerf 10 is cut around the trunk of the live tree or around a limb or branch thereof or partly around the circumference of such trunk, limb or branch. This kerf extends inward a substantial depth and is of a width sufficient to admit the introduction of a coloring substance. The cutting of the kerf severs the fibers of the tree where it occurs and leaves the pores open on opposite sides of the kerf. The kerf or incision 10 is closed at its outer edge by a packing 15 which may be in the form of a tarred cord of larger diameter than the width of the kerf. Then a gimlet hole 11 which serves as a feed hole is made in the tree and leads from the outer surface thereof to the kerf chamber 10 closed by the packing 15 as aforesaid. A nipple 16 is preferably inserted in the outer end of this feed hole.

A vessel 20 for containing a coloring matter in liquid form is hung adjacent to the tree, as for instance, from a hook 5 driven into the trunk thereof above the feed nipple. A feed tube 25 provided with a valve 26 connects the vessel 20 with the nipple 16 of the kerf chamber 10. A coloring matter is contained in the vessel 20. The valve 26 is opened permitting the coloring matter to flow into the chamber 10 where it is exposed to contact with the open severed ends of the active pores of the live tree and will be taken up in the circulation thereof and distributed along the line of the fibers or pores through which it travels. The coloring matter is applied immediately after the incision or severing of the fibers and before the withering of the foliage causes it to lose its influence of inducing circulation through the pores.

Fig. 4 represents another form of carrying out this invention. In this case an incision is made in the trunk, limb or root of the living tree and coloring matter in the form of liquid, powder or granules is placed in said incision and then the outer end thereof is plugged up.

The following are samples of coloring matter that may be used for this purpose, a weak solution of copperas, a weak solution of sulfate of copper, a weak solution of nitric acid, or of sulfuric acid, or prussiate of potash, liquid dyes, nitrate of silver and coal tar colors.

The coloring matter is fed to the tree for a period sufficient to effect the coloring of the interior fibers up to the desired height which can be ascertained from time to time by lateral tapping of the tree. The period of feeding will vary with different trees of different species or of different heights. In some cases, in bright, clear, sunny days the tree circulation will effect the color of the interior fibers at the rate of about eight inches an hour, more or less. In dark or stormy days the circulation will be less rapid and the color effect will be very slow.

The product of this process is a wood containing within its cellular structure naturally distributed artificial coloring matter, that is artificial coloring matter introduced during the life of the tree by the sap circulation thereof. In a wood so colored an unnatural tint has the appearance, except as to color, of a natural tint.

I claim as my invention:

1. The art of coloring wood which consists in inserting in tissues of the living tree coloring matter capable of distribution by the natural circulation thereof and of effecting a substantial change in the color of the tissues with which it comes in contact, and permitting such coloring matter to be distributed by the natural circulation of the tree.

2. The art of coloring standing live timber which consists in cutting or severing a portion of the fibers thereof, applying coloring matter to the pores thus exposed and permitting the circulation within the live tree to carry and distribute said coloring matter into parts of the body thereof.

3. The art of coloring standing live timber which consists in severing a portion of the fibers through a given area, applying coloring matter to the cut surface and permitting the circulation of the live tree to carry said coloring matter into the body thereof.

4. The art of coloring standing live timber which consists in making an incision in a live tree, inserting coloring matter therein and permitting the circulation of the live tree to take up and carry such coloring matter into the body of the tree.

5. The art of coloring wood which consists in sawing a kerf partially through a tree trunk, inserting coloring matter in such kerf and permitting the circulation of the live tree to take up and carry such coloring matter into the body thereof.

6. The art of coloring wood which consists in sawing a kerf partially through a tree trunk, closing the outer edges of said kerf, and inserting a liquid coloring matter under slight pressure into said kerf and permitting the circulation of the live tree to take up and carry such coloring matter into the body of the tree.

7. The art of coloring wood which consists in making a fiber severing incision in a live tree, inserting coloring matter therein and permitting the circulation of the live tree to take up and carry such coloring matter into the body thereof.

8. The art of coloring wood which consists in cutting an annular kerf around the body of a tree, closing the outer edges of said kerf by a suitable packing, feeding coloring matter into said closed kerf and permitting the circulation to take up and distribute said coloring matter into the body thereof.

9. The art of coloring wood which consists in sawing a kerf in the trunk of a live tree, applying closing means to the outer edge of said kerf, feeding a coloring liquid into the closed kerf and permitting the circulation of the living tree to assist in distributing the coloring matter.

10. The product herein described comprising wood containing within its cellular structure naturally distributed artificial coloring matter.

LEVI S. GARDNER.

Witnesses:
F. C. SOMES,
J. A. GOTTLIEB.